(12) United States Patent
Dundon

(10) Patent No.: US 7,594,670 B2
(45) Date of Patent: Sep. 29, 2009

(54) VEHICLE SUSPENSION SYSTEM AND METHOD

(75) Inventor: Christopher Brian Dundon, Pataskala, OH (US)

(73) Assignee: Honda Motor Co., Ltd., Tokyo (JP)

( * ) Notice: Subject to any disclaimer, the term of this patent is extended or adjusted under 35 U.S.C. 154(b) by 422 days.

(21) Appl. No.: 11/084,234

(22) Filed: Mar. 21, 2005

(65) Prior Publication Data

US 2006/0208448 A1 Sep. 21, 2006

(51) Int. Cl.
*B60G 3/02* (2006.01)
(52) U.S. Cl. .................. 280/124.152; 280/124.106; 280/124.166
(58) Field of Classification Search .......... 280/124.152, 280/124.106, 124.107, 124.125, 124.137, 280/124.149, 124.166; 267/183, 185, 188, 267/189, 273, 276
See application file for complete search history.

(56) References Cited

U.S. PATENT DOCUMENTS

| | | | | |
|---|---|---|---|---|
| 3,202,236 A | * | 8/1965 | Allison | 180/352 |
| 3,918,737 A | * | 11/1975 | Hofmann et al. | 280/124.152 |
| 4,146,249 A | * | 3/1979 | Paul | 280/124.15 |
| 4,249,753 A | * | 2/1981 | Froumajou | 280/790 |
| 4,570,969 A | | 2/1986 | Tsutsumi et al. | 280/664 |
| 5,064,216 A | | 11/1991 | Hynds | 280/689 |
| 5,102,160 A | | 4/1992 | Stowe | 280/689 |
| 5,702,121 A | | 12/1997 | Song | 280/689 |
| 5,829,769 A | | 11/1998 | Hillqvist | 280/124.107 |
| 6,659,475 B2 | | 12/2003 | Clements et al. | 280/5.508 |
| 6,789,812 B2 | | 9/2004 | Peterson | 280/124.152 |
| 2003/0209870 A1 | | 11/2003 | Carlstedt et al. | 280/124.107 |

FOREIGN PATENT DOCUMENTS

| | | |
|---|---|---|
| JP | 5077632 | 3/1993 |
| JP | 6156042 | 6/1994 |

* cited by examiner

*Primary Examiner*—Eric Culbreth
(74) *Attorney, Agent, or Firm*—Cermak Kenealy Vaidya & Nakajima LLP

(57) ABSTRACT

A vehicle suspension system can include a multi-mount bracket that includes connective structures configured to simultaneously connect a control arm, a stabilizer bar, and a vehicle frame together. The multi-mount bracket can be shaped such that there is a bearing opening for attachment to the control arm via a bushing, and three additional openings for attachment to the stabilizer bar and vehicle frame. The additional openings can include a tapped opening. A method for controlling the suspension of a vehicle can include simultaneously attaching a control arm, a stabilizer bar, and a vehicle frame together via a multi-mount bracket.

20 Claims, 4 Drawing Sheets

VEHICLE SUSPENSION SYSTEM AND METHOD

BACKGROUND OF THE INVENTION

1. Field of the Invention

The invention relates to a vehicle suspension system and method that includes a multi-mount suspension bracket system. More particularly, the invention relates to a vehicle suspension system in which a multi-mount bracket can simultaneously attach a suspension arm, a stabilizer bar and a vehicle frame.

2. Brief Description of the Related Art

Vehicle suspension systems typically include a complicated set of linkages, pneumatic devices, and springs that aim to provide a smooth ride for a vehicle. For example, a four bar linkage suspension can include lower and upper control arms connected on each side of the frame of a vehicle. The control arms are rotatably connected to the vehicle frame (e.g., by a "bar" type pivot/connecting device) so that they can rotate and move substantially vertically with respect to the vehicle frame. A knuckle typically connects each of the lower control arms to a respective upper control arm and a wheel mount structure can be attached to the knuckle. Thus, the wheel, when mounted, is permitted to move in a vertical direction relative to the vehicle frame. A stabilizer bar can be connected between the left and right side control arms such that when a particular vertical movement occurs in a wheel on one side of the vehicle, a corresponding movement can take place in the corresponding wheel on the other side of the vehicle. This action prevents roll of the vehicle during turning and/or maneuvering over rough/bumpy roadway surfaces.

A spring is typically connected from one of the upper or lower control arms to the vehicle frame, and a strut or shock absorber is also connected between the respective control arm and vehicle frame. Thus, the vertical movement of the wheel can be controlled and damped to provide a relatively smooth ride for the vehicle.

Although the above-described four bar suspension system is one of the most common types of vehicle suspension systems, there are countless other types of vehicle suspension systems. Another common vehicle suspension system is the two bar suspension system. In one example of a two bar suspension system, a lower control arm can be pivotally connected to a vehicle frame. A lower portion of a knuckle can be connected to the lower control arm and an upper portion of the knuckle can be connected to a rotary link member that incorporates a spring and shock absorber system. Thus, the upper control arm is not necessary in this case. The invention can also be incorporated into rear suspension systems for vehicles.

The manner in which each of the components of a vehicle suspension system is connected to the frame of the vehicle and to each other has not typically been given a great deal of consideration other than to ensure proper functionality. One counterexample is U.S. Pat. No. 5,102,160, which discloses a Connector Assembly for a Stabilizer Bar in which a stabilizer bar is connected to a control arm by a connector assembly that is designed to eliminate the need for costly eyeforms at the ends of the stabilizer bar, according to that patent. However, the connection assembly of U.S. Pat. No. 5,102,160 only provides a connection between the stabilizer bar and control arm.

Typical vehicle suspension systems often require a great number of attachment mechanisms, and a great deal of space. The high number of components and their complex shapes also add cost and weight to a vehicle. In addition, the large volume required for these components also creates restrictions in design and also creates problems during repair in terms of added time required for repair due to limited access to components, and added cost due to this added repair time and due to multiple part requirements.

SUMMARY OF THE INVENTION

According to an aspect of the invention, a vehicle suspension system can include a vehicle frame and a pair of control arms connected to the vehicle frame such that the control arms can move substantially vertically with respect to the vehicle frame. Each control arm can be configured to be connected to a wheel attachment structure for the vehicle. A stabilizer bar can be located adjacent the pair of control arms and can include at least one attachment structure. A multi-mount bracket can be provided and can include a connective structure configured to simultaneously connect to one of the control arms, the attachment structure of the stabilizer bar, and the vehicle frame.

In accordance with another aspect of the invention, the attachment structure of the stabilizer bar can include a separate clamp bracket configured to restrain the stabilizer bar in at least one direction of movement, the separate clamp bracket being directly connected to the multi-mount bracket.

In accordance with yet another aspect of the invention, the attachment structure of the stabilizer bar can be integral with the stabilizer bar.

In accordance with still another aspect of the invention, a vehicle suspension system can include a vehicle frame, a first wheel mount structure, a first control arm structure connected to the wheel mount structure, a stabilizer mechanism located adjacent the control arm structure, and means for simultaneously connecting the stabilizer mechanism, control arm, and vehicle frame.

In accordance with another aspect of the invention, a method for controlling the suspension of a vehicle can include providing a vehicle frame and a first control arm connected to the vehicle frame such that the first control arm can move substantially vertically with respect to the vehicle frame. The method can also include providing a stabilizer bar located adjacent the first control arm and including at least one attachment structure. The method can further include providing a multi-mount bracket and attaching the stabilizer bar and control arm to the multi-mount bracket, and attaching the multi-mount bracket to the vehicle frame.

Still other objects, features, and attendant advantages of the invention will become apparent to those skilled in the art from a reading of the following detailed description of embodiments constructed in accordance therewith, and taken in conjunction with the accompanying drawings.

BRIEF DESCRIPTION OF THE DRAWINGS

The invention of the present application will now be described in more detail with reference to exemplary embodiments of the apparatus and method, given only by way of example, and with reference to the accompanying drawings, in which.

DETAILED DESCRIPTION OF PREFERRED EMBODIMENTS

Figure 1:
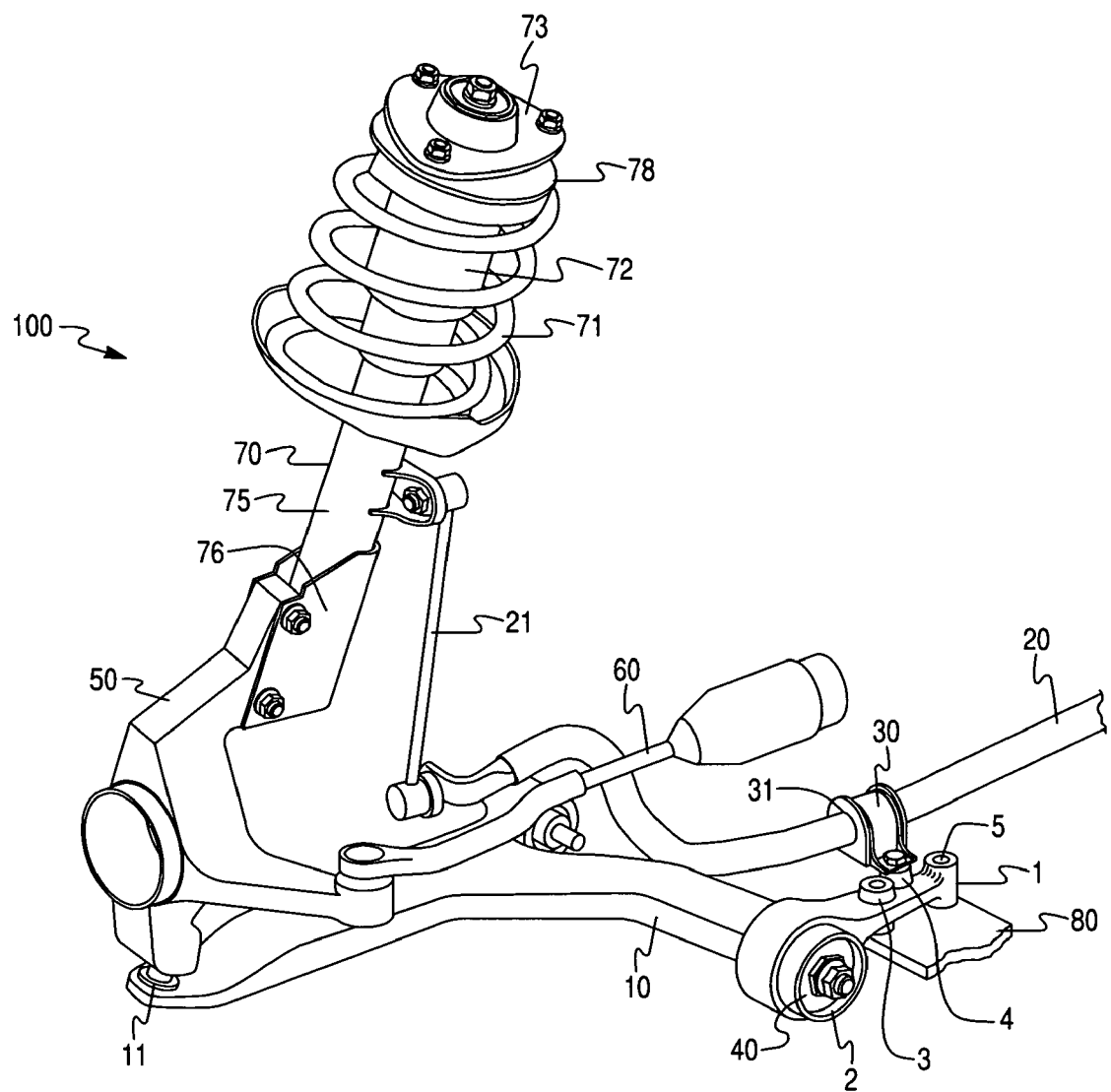
FIG. 1 is a perspective view of an embodiment of a vehicle suspension system made in accordance with principles of the invention.

Referring to the drawing figures, like reference numerals designate identical or corresponding elements throughout the several figures.

FIG. 1 shows a perspective view of an embodiment of a vehicle suspension system 100 made in accordance with the principles of the invention. The vehicle suspension system 100 can include a knuckle/wheel mount 50 that is connected to the vehicle frame 80 via a lower control arm 10 and an upper link assembly, such as a strut 70. (If a four bar linkage is preferred, strut 70 can be replaced with an upper control arm and separate shock absorber).

The strut 70 can include a compression/dampening member such as shock absorber 75 and spring 71 that permit vertical movement of the knuckle/wheel mount 50 relative to the vehicle frame 80. A frame attachment plate 73 can be provided on an upper portion of the strut 70 for attachment to a different portion of the vehicle frame 80, and a dust cover 72 can be provided on a top portion of the strut 70. A bracket 76 can be provided at an opposite lower end of the strut 70 for attachment to an upper portion of the knuckle/wheel mount 50. The strut 70 can include a shock 75 that is connected to an upper portion of the knuckle/wheel mount 50 by the bracket 76 such that the knuckle/wheel mount 50 can rotate and turn with respect to the strut 70 and with respect to the vehicle frame 80. A bearing or rotary link member 78 can be located directly underneath the frame attachment plate 73 to provide relative movement between the strut 70 and the frame of the vehicle.

The knuckle/wheel mount 50 can be attached to the lower control arm 10 at joint 11. The joint 11 can be configured to permit the knuckle/wheel mount 50 to move in a substantially vertical motion with respect to the vehicle frame 80 while also permitting the knuckle/wheel mount 50 to turn with respect to the lower control arm 10 and vehicle frame 80.

The lower control arm 10 can be attached to the vehicle frame 80 via a bushing 40 located within a bearing opening 2 of the multi-mount suspension bracket 1. The multi-mount suspension bracket 1 can include a first opening 3 and a third opening 5 in which fasteners can be located for connecting to the vehicle frame 80. The bushing 40 and related assembly allows the lower control arm 10 to pivot with respect to the vehicle frame 80, and thus permits the relative substantially vertical movement of the knuckle/wheel mount 50 with respect to the vehicle frame 80.

A stabilizer bar 20 can also be connected to the vehicle frame 80 via the multi-mount suspension bracket 1. In particular, the multi-mount suspension bracket 1 can include a second opening 4 in which a fastener can be connected to a connective structure of the stabilizer bar 20. For example, a stabilizer bar clamp bracket 30 can be provided for fastening the stabilizer bar 20 with respect to the multi-mount suspension bracket 1. The stabilizer bar clamp bracket 30 can include an opening 31 through which the stabilizer bar 20 can be inserted and free to rotate, if desired/necessary. The stabilizer bar 20 can be connected to the upper rotary link member 75 by a stabilizing bar linkage 21 so that movement of the upper rotary link member 75 can be translated via the stabilizer bar 20 to the opposite wheel mount structure (specifically, to the opposite side upper rotary link member).

A steering linkage 60, e.g., a tie rod, can also be provided and attached to the knuckle/wheel mount structure 50 so that the wheels of the vehicle can be turned by an operator.

Figure 2:
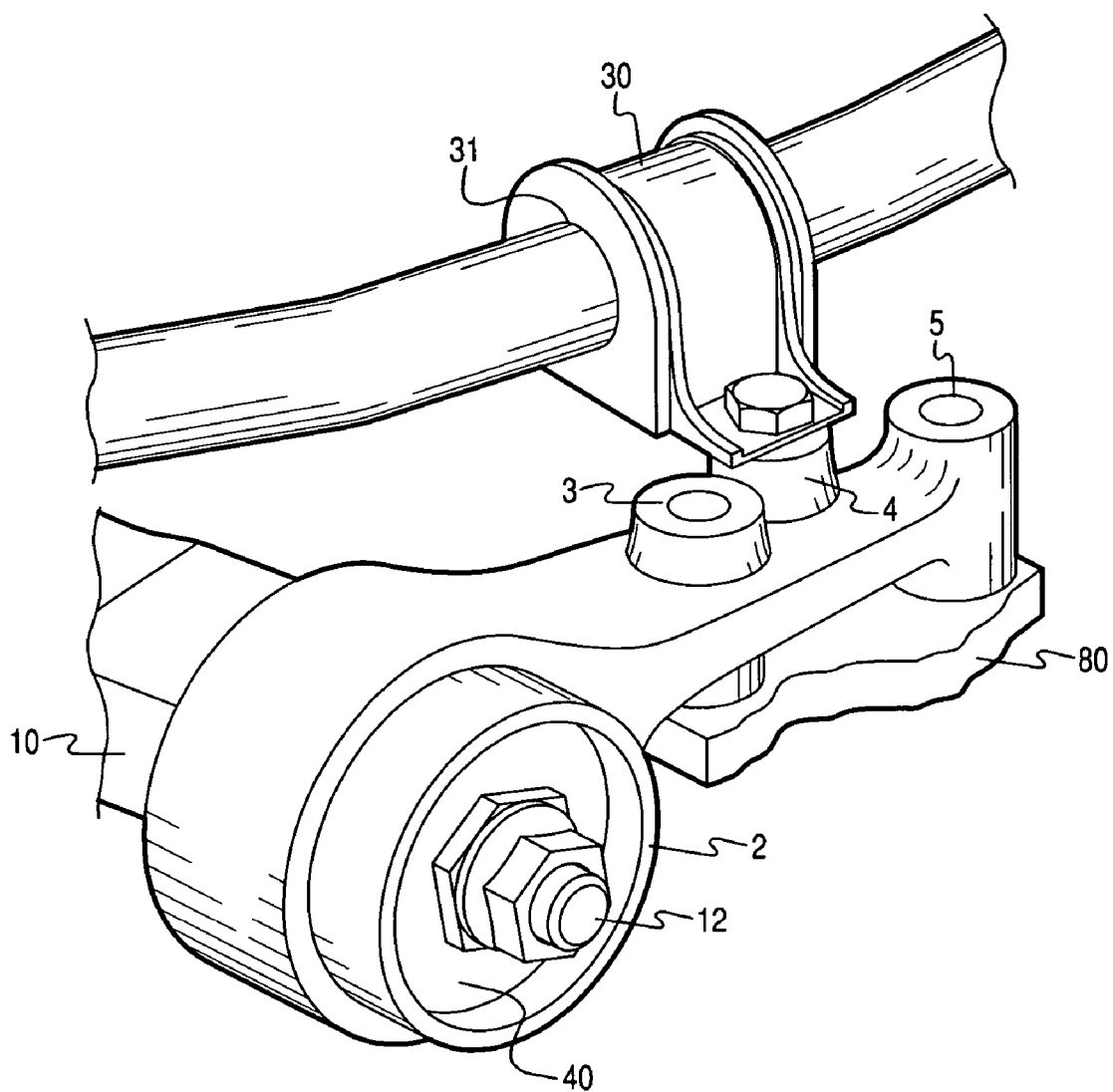
FIG. 2 is a partial and magnified perspective view of the multi-mount suspension bracket, stabilizer bar, and control arm as shown in FIG. 1.

FIG. 2 shows a perspective view of the multi-mount suspension bracket 1 and its connection to the stabilizer bar 20, front right lower control arm 10 and vehicle frame 80. In particular, the multi-mount suspension bracket 1 can include a first opening 3, a second opening 4, and a third opening 5 that are all substantially parallel to each other. Each of the first, second, and third openings can be tapped or untapped, depending on the particular operation/need. In FIG. 2, the first opening 3 and third opening 5 are formed as through-holes for connection to the vehicle frame 80 via a suitable fastener, such as a bolt. The second opening 4 is shown as formed with a tapped hole for connection to a bolt/clamp bracket device 30 on the stabilizer bar 20. The bracket device 30 can include a through-hole 31 through which the stabilizer bar 20 passes and is locked in at least one direction with respect to the multi-mount suspension bracket 1, and thus also similarly locked with respect to the vehicle frame 80.

A bearing opening 2 can be provided at an end of the multi-mount suspension bracket 1 and can have a central axis that is configured to be substantially perpendicular to the central axes of the first opening 3, second opening 4, and third opening 5 of the multi-mount suspension bracket 1. The bearing opening 2 can be press fit (or otherwise fit) onto a bushing 40 that in turn is connected to a pin 12 extending from the lower control arm 10. The bushing 40 and pin 12 permit rotational movement of the control arm 10 with respect to both the multi-mount suspension bracket 1 and the vehicle frame 80.

Figure 3:
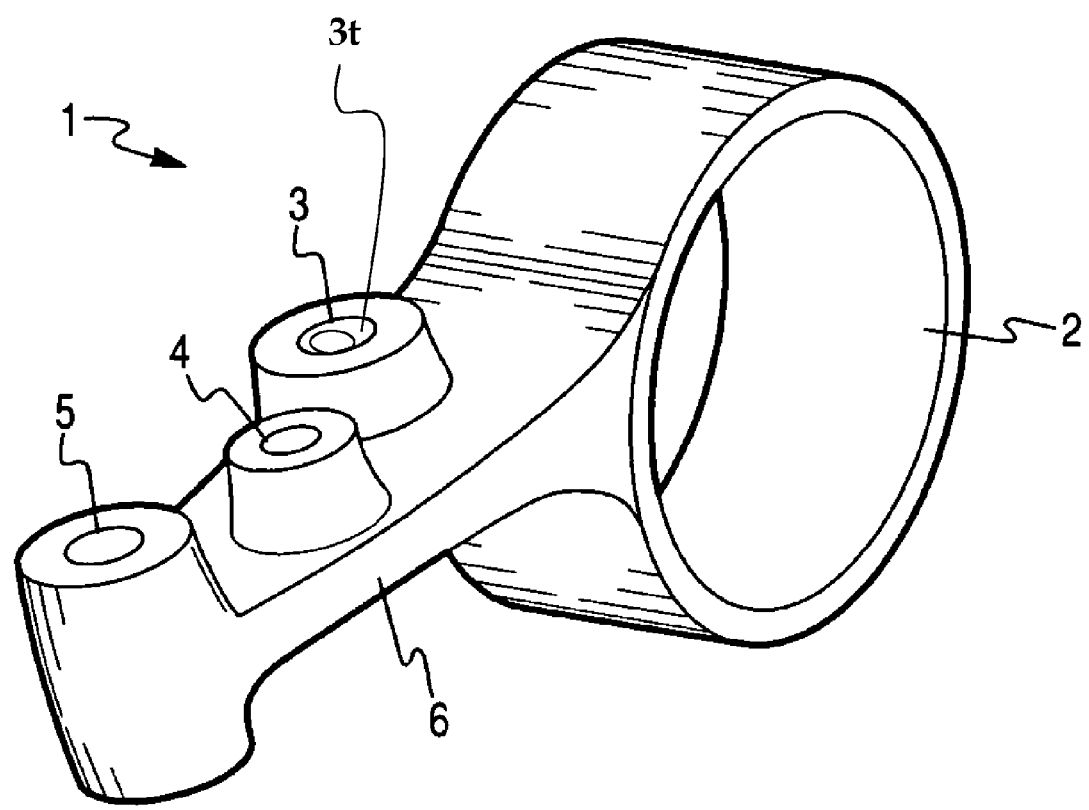
FIG. 3 is a reverse perspective view of the multi-mount bracket of FIG. 1.

FIG. 3 is a reverse perspective view of the multi-mount suspension bracket 1 of FIG. 1. The multi-mount suspension bracket 1 can be a relatively simple structure including a bearing opening 2 at one end and a bracket extension arm 6 that extends from the bearing opening 2 to the opposite end of the multi-mount suspension bracket 1. The first opening 3, second opening 4, and third opening 5 can be located along the extension arm 6. Of course, the specific configuration and geometry of the multi-mount suspension bracket 1 can be more elaborate and can be determined by the space available within the vehicle suspension compartment. For example, the extension arm 6 may require several bends and three dimensional twists to fit within a particular vehicle suspension scheme. In addition, the openings can be tapped, as shown by schematic tap 3t.

Figure 4:
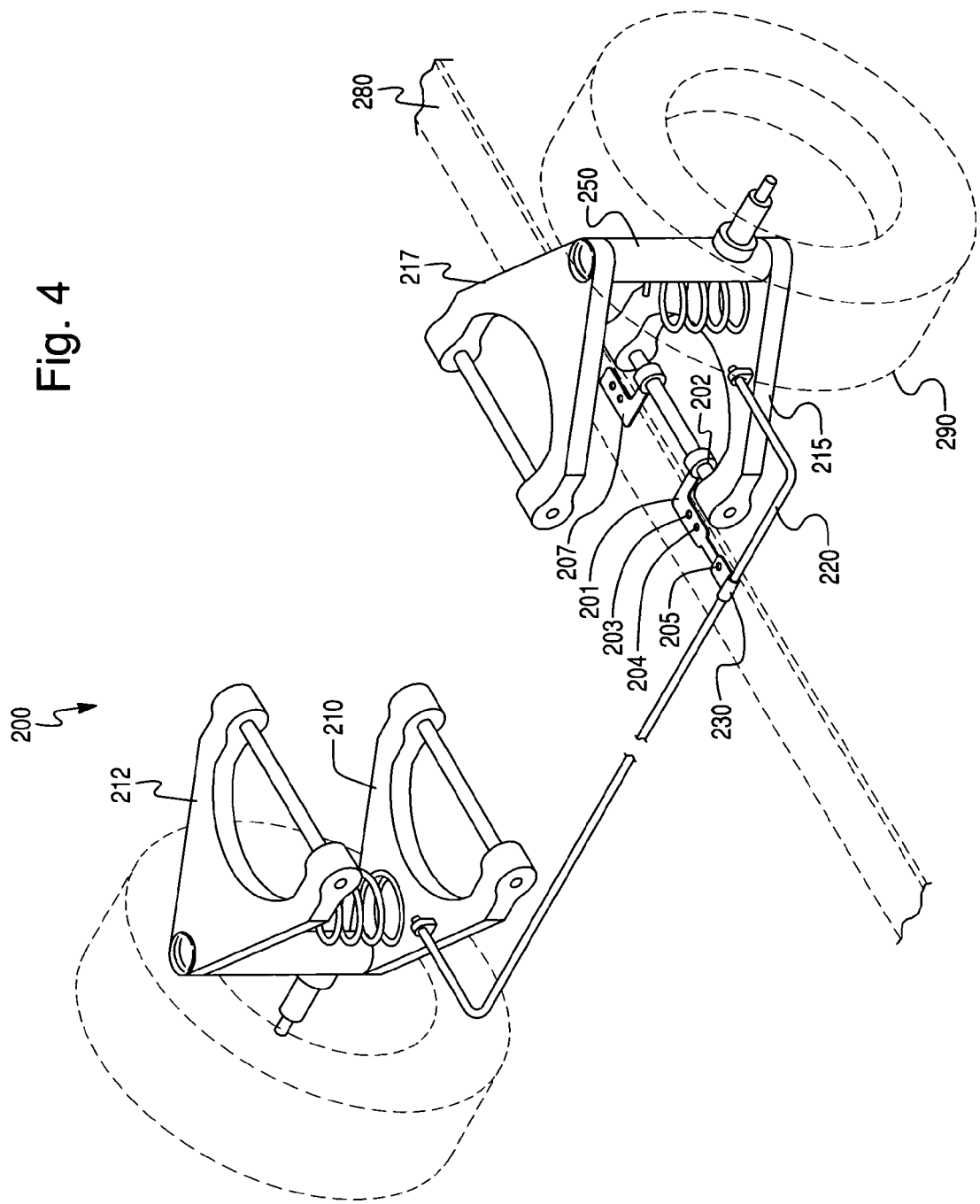
FIG. 4 is a perspective view of another embodiment of a vehicle suspension system made in accordance with principles of the invention.

FIG. 4 shows another embodiment of a vehicle suspension system 200 made in accordance with principles of the invention. The vehicle suspension of FIG. 4 is a four bar suspension system in which an upper front left control arm 217 and lower front left control arm 215 are pivotally mounted to the vehicle frame 280 at one end, and mounted to a knuckle/wheel mount structure 250 at their opposite ends. A wheel 290 can be connected to the knuckle/wheel mount structure 250 and the control arms 215 and 217 can allow the wheel 290 to move substantially vertically as the wheel 290 follows the contour and bumps of a road.

The front right side of the vehicle suspension system can be configured similar to the front left side of the vehicle suspension system. For example, a front lower right control arm 210 and a front upper right control arm 212 can be pivoted from the vehicle frame and connected to a knuckle/wheel mount structure 250.

For purposes of illustration, only the connective structure system for the front lower left control arm 217 is shown and described. A suspension bracket 207 can be used to connect a portion of a far corner end of the lower front left control arm 215 to the vehicle frame 280, while a multi-mount suspension bracket 201 can be used to connect a near corner end of the lower front left control arm 215 to the vehicle frame 280. The multi-mount suspension bracket 201 can also connect the stabilizer bar 220 to the vehicle frame 280 via stabilizer clamp structure 230. A bearing opening 202 can be provided at one end of multi-mount suspension bracket 201, and a bracket arm extension can extend from the bearing opening 202 to a point adjacent the stabilizer bar bracket 230. A first opening 203 and a second opening 204 can be located along the length of the multi-mount suspension bracket 201 for connection to the vehicle frame 280. A third opening 205 can be located at an end of the multi-mount suspension bracket 201 for connection to the stabilizer bar bracket 230.

The multi-mount suspension bracket is preferably configured such that it can simultaneously connect the stabilizer bar, a control arm and the vehicle frame together. The multi-mount suspension bracket makes it possible to manufacture a vehicle suspension system that includes less connective parts, and therefore provides more space within the vehicle suspension system. In addition, the reduction of parts can result in decreased cost for manufacture and repair of the vehicle suspension system.

While certain embodiments of the invention are described above, it should be understood that the invention can be embodied and configured in many different ways without departing from the spirit and scope of the invention. For example, the multi-mount suspension bracket can be configured such that the central axes of the various openings are at angles with respect to each other and include various structures for connecting to the other vehicle suspension components. Furthermore, some or all of the openings can be replaced with welds for simultaneous attachment to the various structures, such as the vehicle frame, the stabilizer bar and the control arm. Bolts, rivets, nuts, pins and other connective devices can also be used in conjunction with the multi-mount suspension bracket for connection to the various structures.

The above-described embodiments disclose the multi-mount suspension bracket as being connected between the stabilizer bar, control arm and vehicle frame. The connection to each of these vehicle suspension components need not be direct, and can be through other connective structures or other vehicle suspension components. In addition, it can be understood that the geometry of the multi-mount suspension bracket can take various forms in order to meet a specific geometrical configuration of a vehicle suspension. It is also conceived that the connective structure between the multi-mount suspension bracket and the stabilizer bar can be integral with the stabilizer bar while either integral or rotational with respect to the multi-mount suspension bracket. Similarly, the connective structure between the control arm and the multi-mount suspension bracket can be integrally or independently formed as a bearing surface on the control arm and a pin structure formed on the multi-mount suspension bracket.

The vehicle suspension system can be any type of suspension system in which a multi-mount suspension bracket can be used to connect three separate structures of the suspension system, and is not limited to a four bar or two bar vehicle suspension system.

While the invention has been described in detail with reference to exemplary embodiments thereof, it will be apparent to one skilled in the art that various changes can be made, and equivalents employed, without departing from the scope of the invention. Each of the aforementioned documents is incorporated by reference herein in its entirety.

What is claimed is:

1. A vehicle suspension system, comprising:
    a vehicle frame;
    a pair of control arms connected to the vehicle frame such that the control arms can move substantially vertically with respect to the vehicle frame, each control arm configured to be connected to a wheel attachment structure for the vehicle;
    a stabilizer bar located adjacent the pair of control arms and including at least one attachment structure; and
    a multi-mount bracket that includes a connective structure that is simultaneously connected to one of the control arms, the attachment structure of the stabilizer bar, and the vehicle frame, wherein the multi-mount bracket includes a bearing opening configured to be connected to the control arm, a first opening configured to be connected to the vehicle frame, and a second opening configured to be connected to the stabilizer bar.

2. The vehicle suspension system of claim 1, wherein the attachment structure of the stabilizer bar includes a separate clamp bracket configured to restrain the stabilizer bar in at least one direction of movement, the separate clamp bracket being directly connected to the multi-mount bracket.

3. The vehicle suspension system of claim 1, further comprising:
    a bushing located between the multi-mount bracket and the control arm.

4. The vehicle suspension system of claim 1, wherein the attachment structure of the stabilizer bar is integral with the stabilizer bar.

5. The vehicle suspension system of claim 1, wherein the multi-mount bracket includes a third opening configured to be connected to the vehicle frame.

6. The vehicle suspension system of claim 5, wherein the bearing opening and the first, second and third openings each have a central axis, and the central axis of the bearing opening is substantially perpendicular to the central axis of the first, second and third openings.

7. The vehicle suspension system of claim 1, wherein a first of said control arms is located on one side of the vehicle frame and a second of said control arms is located on an opposite side of the vehicle frame.

8. The vehicle suspension system of claim 1, wherein the connective structure of the multi-mount bracket includes openings, and at least one of said openings is a tapped opening.

9. The vehicle suspension system of claim 1, wherein the connective structure of the multi-mount bracket includes openings, and at least one of the openings is a non-tapped through-hole.

10. A vehicle suspension system comprising:
    a vehicle frame;
    a first wheel mount structure;
    a first control arm structure connected to the wheel mount structure;
    a stabilizer mechanism located adjacent the control arm structure; and
    means for simultaneously connecting the stabilizer mechanism, control arm, and vehicle frame, wherein the means for simultaneously connecting includes a multi-mount bracket that has a bearing opening for connection to the control arm, an opening for connecting to the stabilizer mechanism, and a first additional opening for connecting to the vehicle frame.

11. The vehicle suspension system of claim 10, wherein the means for simultaneously connecting includes a multi-mount bracket that has a second additional opening for connecting to the vehicle frame.

12. The vehicle suspension system of claim 10, further comprising:
   a second wheel mount structure, and
   a second control arm structure connected to the second wheel mount structure,
   wherein the stabilizer mechanism is configured as a stabilizer bar that extends between the first control arm structure and the second control arm structure.

13. The vehicle suspension system of claim 12, further comprising:
   means for simultaneously connecting the second stabilizer mechanism, the second control arm, and the vehicle frame.

14. The vehicle suspension system of claim 10, wherein the stabilizer mechanism includes a stabilizer clamp for connecting to the multi-mount bracket.

15. The vehicle suspension system of claim 10, wherein the control arm is rotatively connected to the vehicle frame by the means for simultaneously connecting.

16. A method for controlling the suspension of a vehicle comprising:
   providing a vehicle frame, a first control arm connected to the vehicle frame such that the first control arm can move substantially vertically with respect to the vehicle frame, a stabilizer bar located adjacent the first control arm and including at least one attachment structure, and a multi-mount bracket;
   attaching the stabilizer bar and control arm to the multi-mount bracket, and attaching the multi-mount bracket to the vehicle frame;
   providing a first opening in the multi-mount bracket;
   providing two additional openings in the multi-mount bracket;
   attaching the control arm to the multi-mount bracket via the first opening; and
   attaching the stabilizer bar to the multi-mount bracket via one of the two additional openings; and
   attaching the vehicle frame to the multi-mount bracket via the remaining one of the two additional openings.

17. The method of claim 16, wherein attaching the stabilizer bar includes attaching the stabilizer bar directly to the multi-mount bracket via a stabilizer bar clamp structure.

18. The method of claim 16, wherein attaching the control arm includes attaching the control arm directly to the multi-mount bracket via a bushing.

19. The method of claim 16, further comprising:
   providing a third additional opening in the multi-mount bracket; and
   attaching the vehicle frame to the multi-mount bracket via third additional opening.

20. The method of claim 16, wherein attaching the control arm to the multi-mount bracket includes rotatively attaching the control arm to the multi-mount bracket such that the control arm can rotate about a pivot location and with respect to the vehicle frame, and such that the control arm can move in a substantially vertical direction with respect to the vehicle frame at a second location distant from the pivot location.

* * * * *

UNITED STATES PATENT AND TRADEMARK OFFICE
CERTIFICATE OF CORRECTION

PATENT NO. : 7,594,670 B2  Page 1 of 1
APPLICATION NO. : 11/084234
DATED : September 29, 2009
INVENTOR(S) : Christopher Brian Dundon It is certified that error appears in the above-identified patent and that said Letters Patent is hereby corrected as shown below:

Title Page
Attorney, Agent, or Firm (74) should be corrected as follows:

Cermak Kenealy Vaidya & Nakajima LLP
Mark E. Duell

Signed and Sealed this

First Day of December, 2009

David J. Kappos
*Director of the United States Patent and Trademark Office*